United States Patent
Chaudeurge

(10) Patent No.: US 7,857,330 B2
(45) Date of Patent: Dec. 28, 2010

(54) CHILD'S CARRIAGE, IN PARTICULAR A STROLLER

(76) Inventor: Jean-Michel Francois Chaudeurge, Domaine de Muscapeau, Route de Bras, Tourves (FR) F-83170

( * ) Notice: Subject to any disclaimer, the term of this patent is extended or adjusted under 35 U.S.C. 154(b) by 431 days.

(21) Appl. No.: 11/918,568

(22) PCT Filed: Apr. 20, 2006

(86) PCT No.: PCT/FR2006/000866

§ 371 (c)(1),
(2), (4) Date: Oct. 16, 2007

(87) PCT Pub. No.: WO2006/111656

PCT Pub. Date: Oct. 26, 2006

(65) Prior Publication Data

US 2009/0079153 A1   Mar. 26, 2009

(30) Foreign Application Priority Data

Apr. 21, 2005 (FR) .................................. 05 04007

(51) Int. Cl.
*B62B 9/10* (2006.01)
(52) U.S. Cl. ................. 280/47.38; 280/47.25; 280/650; 280/657; 280/658; 280/642
(58) Field of Classification Search ... 280/47.38–47.41, 280/47.131, 47.17, 47.18, 47.24, 47.25, 642–644, 280/647–650, 658
See application file for complete search history.

(56) References Cited

U.S. PATENT DOCUMENTS

| 2,903,820 | A | * | 9/1959 | Bodell | 446/439 |
| 3,890,668 | A | * | 6/1975 | Stosberg et al. | 16/35 R |
| 5,193,896 | A | * | 3/1993 | Oberlander | 362/103 |
| 5,567,037 | A | * | 10/1996 | Ferber | 362/104 |
| 5,584,561 | A | * | 12/1996 | Lahos | 362/473 |
| 5,669,624 | A | * | 9/1997 | Eichhorn | 280/642 |
| 5,930,921 | A | * | 8/1999 | Sorofman et al. | 36/137 |
| 6,082,754 | A | * | 7/2000 | Jeunet et al. | 280/272 |
| 6,315,309 | B1 | * | 11/2001 | Li et al. | 280/47.38 |

(Continued)

FOREIGN PATENT DOCUMENTS

DE     19823070 A1    11/1999

(Continued)

*Primary Examiner*—J. Allen Shriver, II
*Assistant Examiner*—Vaughn T Coolman
(74) *Attorney, Agent, or Firm*—Dowell & Dowell, PC

(57) ABSTRACT

This children's carriage (1) comprises a frame (10) that supports a seat or the like for the child, equipped with a rear bar for pushing the carriage. The frame is equipped, at the front with a warning light controlled by means of a control switch provided on the push bar in order to limit the risks of collisions between the children's carriage and vehicles traveling in proximity thereto such as automobiles. In order to confer a good-looking aesthetic appearance to children's carriage, particularly at the warning light, the frame is equipped with a front wheel (18), which is supported on the ground and joined to the frame by a fork (22') that is articulated with regard to the frame, an external housing (26) of the light (24) forming, at least in part, a decorative element in the area of the articulation of the fork with regard to the frame.

11 Claims, 3 Drawing Sheets

U.S. PATENT DOCUMENTS

| | | | |
|---|---|---|---|
| 6,328,456 B1 * | 12/2001 | Mize | 362/311.02 |
| 6,341,874 B1 * | 1/2002 | Rubin | 362/103 |
| 6,394,633 B1 | 5/2002 | Perez | |
| 6,402,166 B1 * | 6/2002 | Chiu | 280/47.38 |
| 6,572,251 B1 * | 6/2003 | Huang | 362/500 |
| 6,644,826 B1 | 11/2003 | Blum | |
| 6,776,458 B1 * | 8/2004 | Wang | 301/37.105 |
| 6,779,804 B1 | 8/2004 | Liu | |
| 6,822,357 B2 * | 11/2004 | Hung | 310/75 C |
| 6,953,271 B2 * | 10/2005 | Aynie et al. | 362/511 |
| 7,000,935 B2 * | 2/2006 | Gunter et al. | 280/272 |
| 7,008,075 B2 * | 3/2006 | Simoni | 362/108 |
| 7,083,175 B1 * | 8/2006 | Liu | 280/47.38 |
| 7,185,997 B2 * | 3/2007 | Simoni | 362/108 |
| 7,210,690 B2 * | 5/2007 | Tan | 280/47.38 |
| 7,258,353 B2 * | 8/2007 | Liao | 280/47.38 |
| 2002/0195784 A1 * | 12/2002 | Cheng | 280/47.38 |
| 2004/0226134 A1 * | 11/2004 | Chen | 16/35 R |
| 2004/0228127 A1 * | 11/2004 | Squicciarini | 362/240 |
| 2005/0140105 A1 * | 6/2005 | Hernandez | 280/62 |

FOREIGN PATENT DOCUMENTS

| | | |
|---|---|---|
| DE | 201312334 | 3/2004 |
| GB | 1302420 | 1/1973 |

\* cited by examiner

CHILD'S CARRIAGE, IN PARTICULAR A STROLLER

BACKGROUND OF THE INVENTION

1. Field of the Invention

The present invention relates to a child's carriage, such as a stroller, a baby carriage, or a tricycle, i.e., more generally, a wheeled vehicle for transporting a young child while being pushed by an adult.

2. Brief Description of the Related Art

In operation, the adult in charge of causing this type of carriage to move forwards is necessarily placed behind the carriage in order to push it forwards, by applying a corresponding thrust force to one or two thrust elements, such as a bar, handles, etc., arranged at the rear of the frame of the carriage.

This leads to a degree of danger for the on-board child when the adult is about to engage a crossing over which fast vehicles such as cars also pass, since the adult, the only person capable of estimating the risk of potential collisions on causing the stroller to advance, is remote from the front portion of the frame of the carriage, i.e. remote from the zone of the stroller that becomes engaged first on the dangerous crossing. This applies in particular when the child's carriage is pushed to cross a road, e.g. on a pedestrian crossing.

In the beginning of the 1970s, GB-A-1 302 420 proposed a stroller with wheels that are not swivel-mounted relative to the frame, in which a front end bar is fitted with a warning light for warning the drivers of motor vehicles traveling close to the stroller, e.g. when the stroller is engaged on a pedestrian crossing. The warning light is controlled by a switch at the rear that can be actuated by the adult pushing the stroller. The risk of collision with the stroller is thereby reduced, but in practice the warning system proposed is designed merely to be fitted onto the pre-existing frame of the stroller, which considerably degrades the overall appearance of the stroller. In particular, the housing of the warning light is attached to the frame of the stroller by a bulky clip or the like, reinforcing the relatively unattractive effect of a "add-on" part.

More recently, U.S. Pat. No. 6,394,633 proposed a frame for a three-wheel stroller including a swivel-mounted front wheel. One or more headlights, provided at the front of the frame emit light beams directed towards the ground in order to illuminate the path in front of the stroller, but without being suitable for providing effective warning to vehicle drivers moving in the neighborhood of the stroller, in particular those approaching it from the side. In addition, as in GB-A-1 302 420, those headlights are designed as parts that are added onto a pre-existing stroller frame, with the housing of each headlight being assembled to the frame in a purely juxtaposed manner.

SUMMARY OF THE INVENTION

The object of the present invention is to propose a child's carriage with a front warning light, in which the carriage is attractive in appearance, in particular in the vicinity of the light.

To this end, the invention provides a child's carriage as defined in claim 1.

With the child's carriage of the invention, the means for swivel-mounting the front fork relative to the frame can be pleasingly hidden within the housing of the warning light. The housing is thus attractively integrated in the frame, and in particular in its front portion. In other words, the child's carriage of the invention provides excellent integration between its warning light and its frame. It will be understood that the housing can thus present a variety of outside shapes presenting an appearance, when associated with the appearance of the front portion of the frame and of the fork, that advantageously produces a visible "signature" effect specific to the carriage.

When the child's carriage of the invention, while being pushed from behind by an adult, is on the point of engaging a dangerous crossing that is also crossed by vehicles traveling at relatively high speed, the adult actuates the switch to switch on the warning light so as to warn such vehicles of the presence of the child's carriage. For example, when the child's carriage is engaged on a pedestrian crossing in order to cross a road, the adult switching on the warning light delivers a light signal that attracts the attention of drivers of cars and other vehicles that are traveling on the road and that might strike the child's carriage. Since the warning light is situated at the front of the frame of the child's carriage, the light signal it emits reaches such drivers as soon as the front of the stroller has engaged the danger zone, even though the adult pushing the child's carriage is still set back a long way from the danger zone. The adult has no difficulty in switching the warning light on and off since the control switch is situated on the element for pushing the child's carriage, in other words on the portion of the frame where the adult positions the hands on a permanent basis for delivering the thrust needed for propelling the carriage forwards.

Other characteristics and advantages of this child's carriage, taken in isolation or in any other technically feasible combination are set out in dependent claims 2 to 12.

BRIEF DESCRIPTION OF THE DRAWINGS

The invention can be better understood on reading the following description given purely by way of example and made with reference to the accompanying drawings, in which.

DESCRIPTION OF THE PREFERRED EMBODIMENTS

Figure 1:
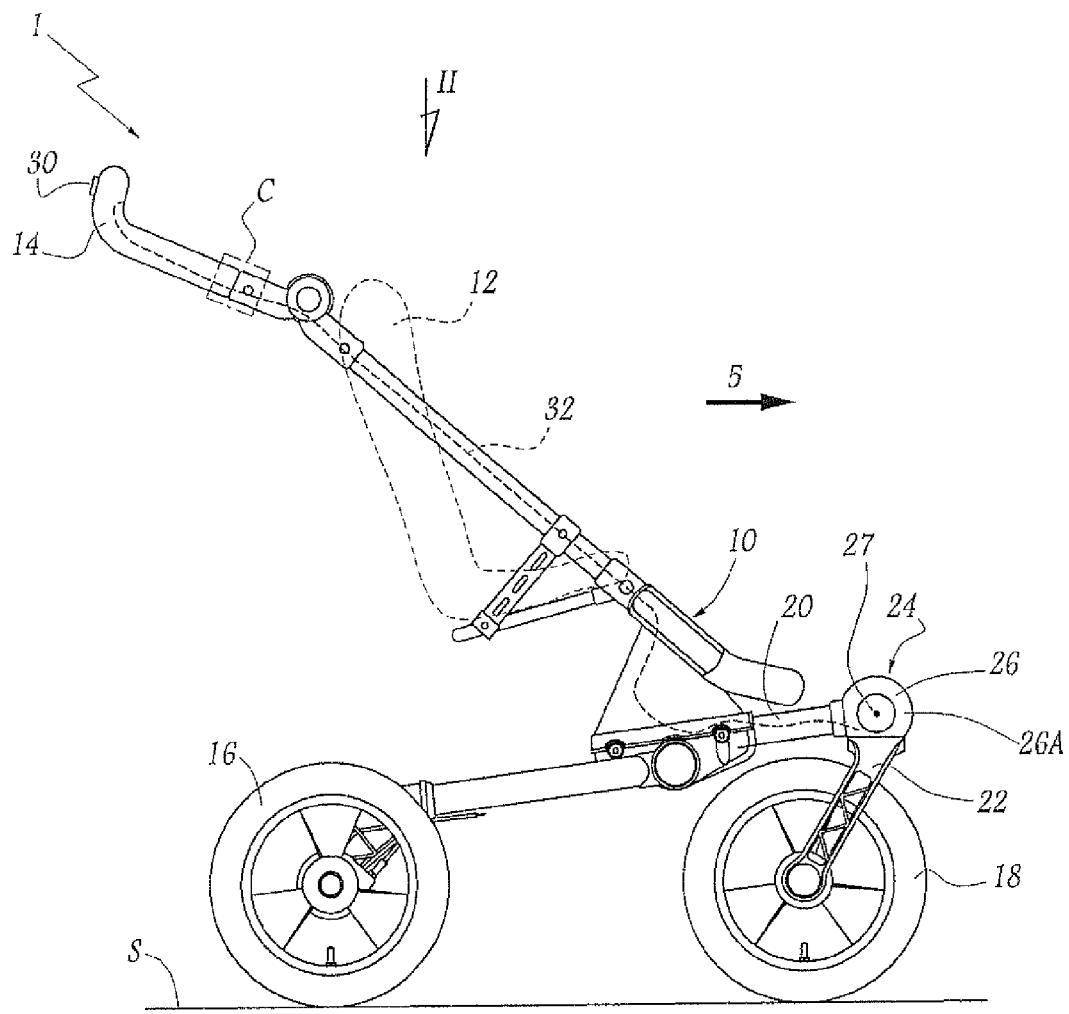
FIG. 1 is an elevation view of a child's carriage of the invention, of the stroller type.
Figure 2:
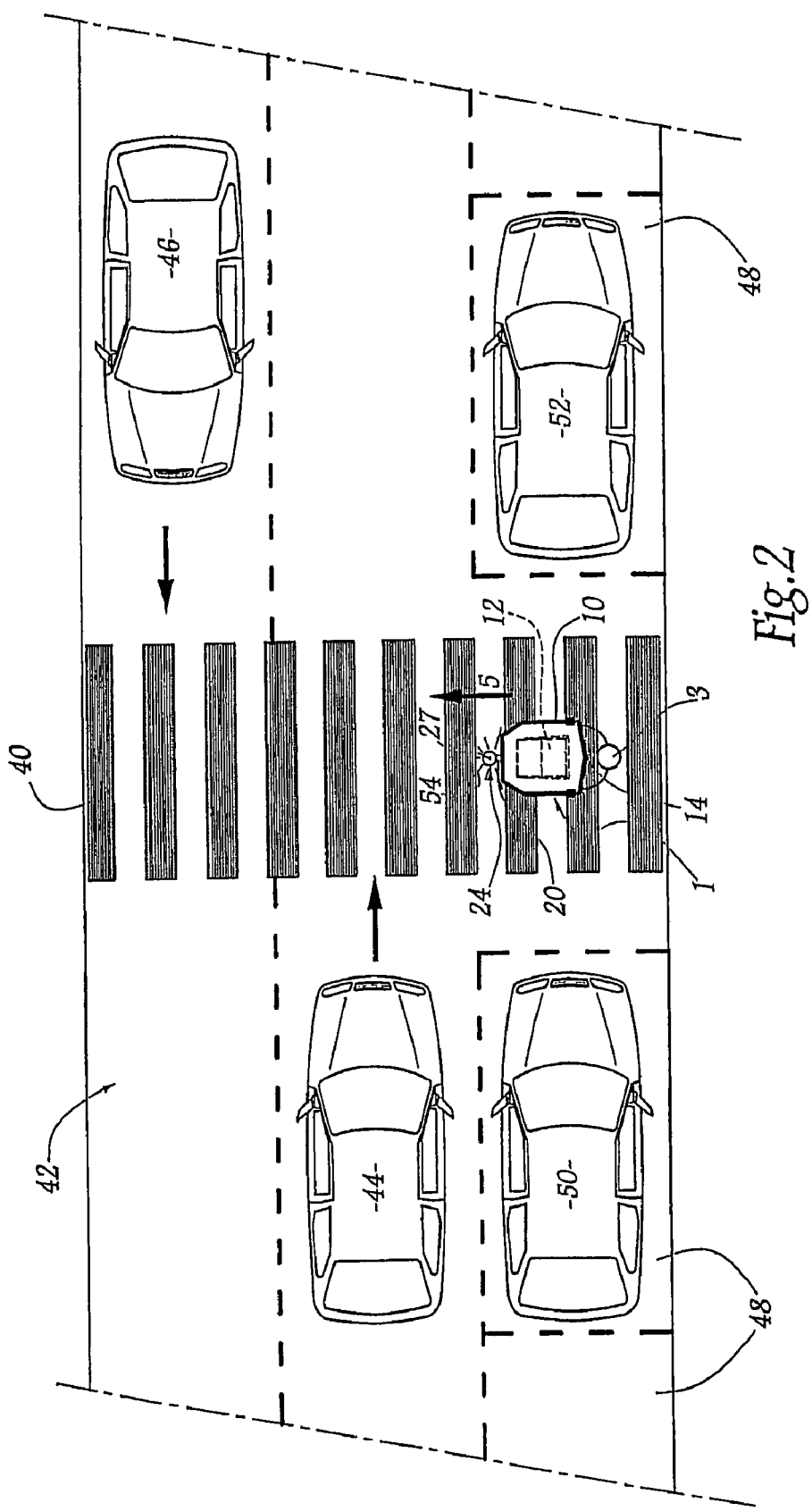
FIG. 2 is a diagrammatic view of the FIG. 1 carriage seen looking along arrow II, showing how the carriage is used.

FIGS. 1 and 2 show a carriage 1 for transporting a young child, being pushed on the ground S by an adult 3 shown in FIG. 2 only. The stroller has a hinged frame 10 having a seat 12 fitted thereto (shown in dashed outline only), in which the child being transported sits. For clarity of the drawings, the child is not shown in the figures. In a variant not shown, the seat 12 could be replaced by a cot or the like enabling the child to be transported in the prone position. The frame 10 shown in the figures is merely an illustrative example of a stroller frame that can be used in the context of the present invention, but other frame structures could be provided, whether hinged or not.

For convenience, in the description below, directional terms are used relative to the frame 10 of the stroller 1, such that the terms "top" and "high" designate a direction going away from the ground S and corresponding to the high portion of FIG. 1, while the terms "bottom" and "low" designate an opposite direction, such that the observation arrow II for FIG. 2 relative to FIG. 1 points downwards.

Similarly, the terms "front" and "rear" are used relative to the normal forward direction of the stroller 1, i.e. the direction in which the stroller is normally pushed, as represented by an arrow 5 in FIGS. 1 and 2, which arrow points forwards. Similarly, the terms "left" and "right" are defined relative to the forward direction of the stroller 1, such that they designate respectively the left and right portions of FIG. 2, with only the right-hand side of the stroller 1 being visible in FIG. 1.

In its high portion, the frame 10 is fitted with a push bar 14 extending transversely relative to the forward direction of the stroller, and over substantially the entire width of the frame. This bar is situated behind and projects from the remainder of the frame 10 so as to be gripped by the adult when seeking to push the stroller in the direction of arrow 5. Seen from above, the bar 14 is generally in the form of a flat V-shape, with its tip directed rewards, as shown in FIG. 2. This shape makes the bar easier for the adult 3 to grip since the bar can be gripped naturally in both hands so as to apply a forward thrust force to the stroller, as well as a change-of-direction force when it is appropriate to turn the stroller.

The frame 10 is supported on the ground S by three wheels, specifically two rear wheels 16 on the left and right sides, and a front wheel 18 in the middle. The frame 10 has a middle front rod 20 that extends in the direction of arrow 5 and that has a fork 22 swivel-mounted to the front end thereof for connecting the frame 10 to the front wheel 18.

The stroller 1 also has a warning light 24 arranged at its front end in the middle portion of the frame 10. More precisely, this light 24 comprises a generally spherical hollow outer housing 26 that is secured in fixed manner to the front end of the rod 20 of the frame 10, so as to project forwards. The housing 26 forms a decorative covering for the zone where the fork 22 is swivel-mounted to the rod 20, conferring an attractive appearance of the front portion of the stroller 1.

Inside the housing 26, the light 24 comprises a light source, represented in diagrammatic manner only in the figures by a point referenced 27, such as a light bulb or the like, and intended to produce a light signal when the light source is electrically powered.

Advantageously, the light 24 is associated with an electrical power supply unit suitable for causing the above-mentioned light source to flash, such that the light signal that is emitted is seen to flash in a manner that is associated in the mind of a driver, and more generally in the mind of any road user, with the flashing of a "warning" type light that is characteristic of a vehicle that is stationary or traveling at an abnormally slow speed.

The housing 26 protects the light source and its electrical power supply unit from the outside, in particular from bad weather and impacts.

The housing 26 is also demountable so as to make it possible, where necessary, to replace the light source and/or its power supply unit.

To enhance the safety of the stroller 1, each of the left and right sides of the housing 26 for the light 24 is made in the form of a flat 26A that extends in substantially vertical manner relative to the ground S. Each of these flats is coated in a retro-reflector covering for reflecting light whenever it is illuminated by a light beam extending transversely to the direction of arrow 5.

In order to control the supply of electricity to the light source 27 of the light 24, the stroller 1 is provided with a switch 30 carried by the push bar 14. The switch is situated in the zone of the bar 14 that is to be held in the hands of the adult 3 in charge of pushing the stroller 1 and it can be actuated merely by being pressed by a finger, or by a similar action. The switch 30 is electrically connected to the light 24, preferably via low-voltage electrical conductors 32 that extend inside the hollow frame 10. The path followed by the conductors 32 is represented highly diagrammatically by dashed lines in FIG. 1. From a functional point of view, the switch makes and breaks connection between the electrical power supply circuit and the light source 27 of the light 24, and the nature of the switch could equally well be mechanical, making the user-actuatable portion of the switch in the form of a pushbutton, or fluidic, making said user-actuatable portion in the form of a pressure membrane button.

The actuatable portion of the switch 30 carries external marking representative of its function of controlling the light 24. In particular, the button carries a pictogram in the form of a triangle, commonly associated with the above-mentioned warning lights.

The use of the stroller 1, and in particular of its warning light 24, is described below with reference to FIG. 2.

FIG. 2 shows the adult 3 pushing the stroller 1 and engaging it on a pedestrian crossing 40 that extends transversely across a road 42, with a car 44 approaching the crossing 40 from the left, and a car 46 approaching it from the right. The side of the road 42 has parking places 48, and the crossing 40 begins between two parking places and extends towards the other side of the road, with stationary cars 50 and 52 being parked respectively to the left and the right of the crossing 40.

When the adult 3 engages the stroller 1 on the beginning of the pedestrian crossing 40, the adult actuates the switch 30 in such a manner as to cause electrical power to be delivered to the light source of the light 24, thereby producing a flashing light signal referenced 54 in FIG. 2. This signal can be seen by the adult 3, who can thus check immediately that the light 24 has indeed been switched on.

As soon as the stroller 1 has been pushed forward far enough by the adult 3 for its light 24 no longer to be masked from the drivers of the cars 44 and 46 by the parked cars 50 and 52, i.e. as soon as the front end of the stroller carrying the light 24 has come up to or gone slightly beyond the line defined by the sides of the cars 50 and 52 facing towards the road 42, as in FIG. 2, these drivers are warned of the presence of the stroller 1. The flashing signal 54 emitted by the light 24 is naturally associated by drivers with a vehicle in distress or traveling at an abnormally slow speed, such that by reflex they cause their cars to slow down or stop. Thus, even if the left and right sides of the pedestrian crossing 40 are masked from the adult 3 to a greater or lesser extent by the parked cars 50 and 52, that adult nevertheless warns the users of the road 42 that he/she is about to cross the road, by pushing the stroller 1 in front. For this purpose, it can be understood that the light 24 advantageously emits the signal 54 in all horizontal directions, with the horizontal periphery of the housing 26 being arranged for this purpose.

Once the road 42 has been fully crossed, the adult 3 uses the switch 30 to switch off the light 24.

In addition to, or independently of, lighting of the light 24, the retro-reflector zones 26A of the housing 26 of the light 24 reflect to left and to right any light beams that might illuminate them, in particular beams coming from the headlights of the cars 44 and 46.

The light 24 may naturally be used in circumstances other than crossing a road, for example when advancing the stroller along a narrow path, or when light levels are low, etc.

Figure 3:
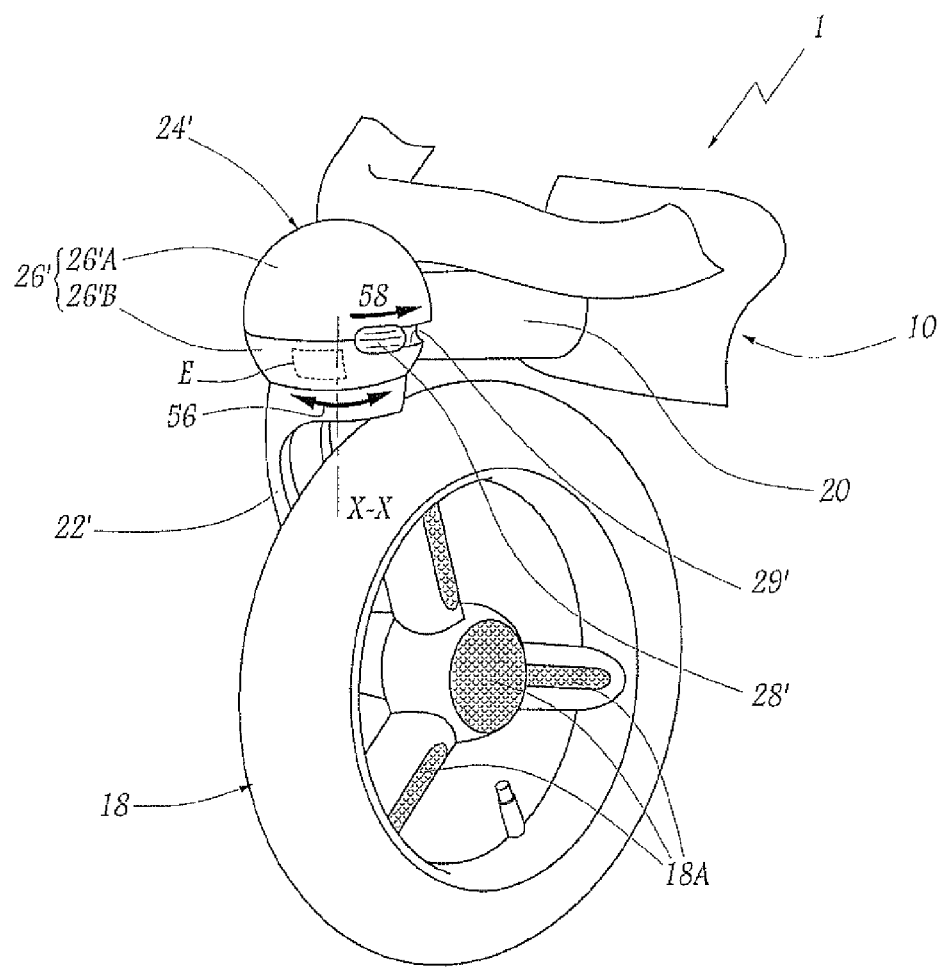
FIG. 3 is a perspective view of a variant in accordance with the invention of the front portion of the FIG. 1 carriage.

In FIG. 3, for which directional terms such as "high", "low", "left", "right", etc. apply in the same manner as in the preceding figures, there can be seen a variant of the front end portion of the stroller 1. The portions of the frame and of the wheel in said portion of the stroller are analogous respectively to the corresponding elements of the stroller shown in FIG. 1, and they are labeled by the same numerical references, i.e. 10 for the frame, 18 for the front wheel, and 20 for the rod of the frame having the wheel 18 arranged at its front end. This variant a warning light 24' functions in analogous manner to the light 24, and is associated with the same components as the light 24 for producing a flashing light signal controlled by the switch 30 at the rear.

The light 24' differs from the light 24 essentially in its outer protective housing 26' that is situated at the front end of the rod 20. The housing 26' is generally spherical in shape, and comprises firstly a top cap 26'A that is substantially hemispherical and that is made of a translucent material to pass the signal emitted by the light source inside the housing, and secondly a bottom base 26'B in the form of a hemisphere with a truncated bottom portion and made of an opaque material. As a result, only the top hemisphere 26'A is lighted in full when the light is switched on.

The overall spherical shape of the housing 26' gives the front portion of the stroller 1 an original appearance that can be thought of as a visual "signature" associated with the stroller, while enabling the above-described technical functions to be incorporated therein.

Advantageously, the top cap 26'A is made of crystal polycarbonate, with the light source of the light emitting light that is colored, in particular orange. The light source is preferably constituted by one or more light-emitting diodes (LEDs) that have the advantage, amongst others, of possessing a very long lifetime. Under such circumstances, the cap 26'A can be permanently secured to the base 26'B with leaktightness that is long-lasting. Similarly, by providing for the electrical power supply unit for the light source of the light not to be stored within the housing 26', but for example to be fitted under the frame 10, the cap 26'A is advantageously sealed permanently, it being understood that electrical conductors analogous to the conductors 32 then connect the power supply unit to the LED(s) constituting the light source.

Figure 4:
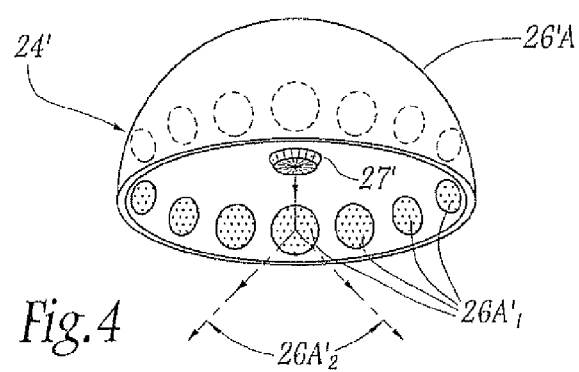
FIG. 4 is a diagrammatic perspective view seen at an angle different from that of FIG. 3 and on a larger scale, showing a portion of the front light of the FIG. 3 carriage.

As shown in greater detail in FIG. 4, the top cap 26'A is optionally provided with a plurality of lens-forming internal facets $26'A_1$ that are distributed around the periphery of the cap in substantially uniform manner. Each facet $26'A_1$ is adapted to form a diverging light beam $26'A_2$ going away from the light 24' when said facet is illuminated from the inside. For this purpose, the light source 27' inside the housing 26' advantageously has a ring of LEDs, with at least one LED being placed facing each facet $26'A_1$. In operation, the beams $26'A_2$ thus together illuminate all horizontal directions extending from the light 24', thereby guaranteeing an omnidirectional light warning, that is effective, for example, for drivers approaching the stroller 1 from either side, as in FIG. 2.

Unlike the housing 26, no retro-reflector zone is provided on the housing 26', but retro-reflector coverings 18A are nevertheless applied to the ends of the hub and to the spokes of the front wheel 18.

The truncated bottom face of the base 26'B forms a docking plane for the top end of a one-armed fork 22' connecting the front wheel 18 to the frame 10. Like the fork 22 in FIG. 1, the fork 22' is swivel-mounted on the frame and in particular can swivel about a substantially vertical axis X-X, with the top end of the fork then sliding against the truncated bottom face of the base 26'B, as represented by arrow 56.

The means for swivel-mounting the fork 22' relative to the frame 10 are hidden within the housing 26' and may be locked by a latch 28' that is slidably mounted in a complementary groove 29' extending in the join plane between the top hemisphere 26'A and the bottom base 26'B of the housing. By means of a locking mechanism internal to the housing 26', the latch 28' can be moved along the groove 29', as represented by an arrow 58, serving in reversible manner to block the angle of orientation of the fork 22', and thus the angle of orientation of the front wheel 18 relative to the frame 10. The direction in which the stroller advances is then substantially fixed.

In a variant of the above-described locking mechanism internal to the housing 26', the mechanism includes an electromagnet connected to the electrical power supply unit associated with the light 24', regardless of whether the unit is internal or external relative to the housing. Such an electromagnet is shown in a simplified manner in dotted line in FIG. 3 with reference to "E". The electromagnet "E" is controlled from outside the housing 26', in particular in the same manner as the light, i.e. by a special control button carried by the push bar 14. Conductors analogous to the conductors 32 are integrated in the hollow frame 10. Under such circumstances, the latch 28' and the groove 29' are of no use except as alternative control means that can be actuated manually, e.g. in the event of the electromagnet malfunctioning.

Another embodiment of a child's carriage of the invention consists in fitting a tricycle frame with a warning light analogous to the light 24, and controlled by an adult in charge of pushing the tricycle by means of a thrust pole that is secured to the rear end of the tricycle frame. The removable pole is fitted with a switch analogous to the switch 30, and releasable electrical connection means between the switch and the light are provided on the frame and on the pole so as to enable the switch to be used to control switching on and off of the light from the rear thrust pole when it is assembled to the frame. Such a releasable electrical connection between the push bar 14 and the frame 10 is shown in a simplified manner in dotted lines in FIG. 1 at "C".

Various arrangements and variants of the stroller and of the tricycle described above can also be envisaged. As examples:
  instead of providing a single front wheel, the frame of the child's carriage can be fitted with a middle set of two front wheels, connected to the frame by a fork in the form of a beam, or the frame can be fitted with two front wheels on either side, the light 24 or 24' then being arranged on a portion of the frame that projects far enough forwards relative to the remainder of the frame;
  other shapes can be envisaged for the push bar 14 for pushing the stroller forwards, for example left and right handles, or an arc that is shaped like a handlebar, etc.;
  in addition to stroller and tricycle frames, the invention also applies to a frame for a baby carriage or the like;
  a plurality of lights analogous to the light 24 or 24' may be provided on a single child's carriage frame in order to improve safety and/or for reasons of appearance;
  the electrical conductors connecting the light 24 or 24' to its control switch 30, and where appropriate connecting the electromagnet for locking the fork 22' to its control switch, may be replaced by a wireless system, such as a radio control system or an infrared system;
  means providing an audible warning of presence may be associated with the light 24 or 24'; for example in the form of a musical pedestrian alarm; such audible warning means, advantageously powered by the electrical power supply unit associated with the light, can be controlled simultaneously with or independently of the light, by using paired switches; and/or
  the light source of the light 24 or 24' may include or may be constituted by one or more flash bulbs, in particular of white color and associated with a housing cap that is colored; such flash bulbs present the advantage of consuming little electricity while delivering a signal that is efficient and powerful, of the camera-flash type; since this signal is emitted substantially from the entire periphery of the housing of the light, the rear peripheral zone of the housing, i.e. the zone facing towards the child on board the carriage and towards the adult pushing the carriage, is covered by an opaque mask to avoid dazzling them.

The invention claimed is:

1. A child's carriage, comprising a frame supporting a seat or a cot for the child, the frame being fitted with:
   a front wheel for bearing on the ground and connected to the frame by a fork that is mounted by a swivel relative to the frame;
   a front warning light having a light source and an outer housing for protecting the light source, the outer housing having a top cap formed of a material through which light from the light source radiates from the housing and a bottom base, the housing forming at least in part a decorative cover for hiding the swivel between the fork and the frame therein;
   the top cap being provided with a plurality of lens-forming internal facets distributed around a periphery thereof and the light source including at least one LED being disposed facing each facet; and
   at least one rear thrust element for pushing the carriage and provided with a switch for switching the light source on and off.

2. The carriage according to claim 1, wherein the front warning light is associated with electrical power supply means for the light source that are adapted to cause the light source to flash.

3. The carriage according to claim 2, including a locking mechanism adapted to act in reversible manner to block the orientation of the fork relative to the frame, the locking mechanism being internal to the housing and wherein the locking mechanism includes an electromagnet connected to the electrical power supply and controlled by the switch carried by the thrust element.

4. The carriage according to claim 1, wherein a truncated bottom face of the base forms a docking and sliding plane for a top end of the fork.

5. The carriage according to claim 1, including a locking mechanism adapted to act in reversible manner to block the orientation of the fork relative to the frame, the locking mechanism being internal to the housing.

6. The carriage according to claim 1, wherein the light source is arranged at least in part to project forwards from a front end portion of the frame.

7. The carriage according to claim 1, wherein the housing of the light source is provided on an outside face with at least one retro-reflector zone.

8. The carriage according to claim 1, wherein the thrust element is permanently secured to the frame, and electrical connection means between the switch and the light source being integrated in the frame.

9. The carriage according to claim 1, wherein the thrust element is releasably connected to the frame and is associated with separable electrical connection means between the switch and the light source.

10. The carriage according to claim 1, wherein the frame is a frame of a wheeled device selected from a group of devices consisting of: a stroller, a baby carriage, and a tricycle.

11. A child's carriage, comprising a frame supporting a seat or a cot for the child, the frame being fitted with:
   a front wheel for bearing on the ground and connected to the frame by a fork that is mounted by a swivel relative to the frame;
   a front warning light having a light source and an outer housing for protecting the light source, the housing forming at least in part a decorative cover for hiding the swivel between the fork and the frame therein;
   the housing of the light source including a substantially hemispherical top cap made of a translucent material to permit passage of the light emitted by the light source inside the housing, and a bottom base in the form of a hemisphere with a truncated bottom portion made of an opaque material;
   the top cap being provided with a plurality of lens-forming internal facets distributed around a periphery thereof, with the light source including at least one LED being disposed facing each facet; and
   at least one rear thrust element for pushing the carriage and provided with a switch for switching the light source on and off.

* * * * *